UNITED STATES PATENT OFFICE.

GEORGE J. POPPLEIN, OF BALTIMORE, MARYLAND, ASSIGNOR, BY MESNE ASSIGNMENTS, TO THE POPPLEIN SILICATED PHOSPHATE FERTILIZER COMPANY, OF SAME PLACE.

IMPROVEMENT IN FERTILIZERS.

Specification forming part of Letters Patent No. 149,244, dated March 31, 1874; reissue No. 7,296, dated September 5, 1876; application filed August 7, 1876.

*To all whom it may concern:*

Be it known that I, GEORGE J. POPPLEIN, of Baltimore city, State of Maryland, have invented certain new and useful Improvements in Fertilizers; and I hereby declare the following to be a full, clear, and exact description of the same.

The invention relates to fertilizing compositions for restoring to the soil the substances which form the food of plants, and which have been abstracted therefrom by previous cropping, or which are naturally deficient in quantity, or entirely wanting in the soil.

My invention consists, broadly, in a fertilizer, having as an ingredient silica in the form of diatomaceous earth or tripoli; and, specifically, in a fertilizer consisting of the aforesaid tripoli and phosphate of lime.

The rationale of successful fertilization, as agreed upon by the most eminent writers upon the subject, such as Liebig, Lawes, Gilbert, and Boussingault, consists in the restoration to the soil of the ingredients removed by the various crops in the proportions in which they are taken up by the entire plant. Analyses of the ash of the various crops show that the principal ingredients of the soil which form plant-food are silica, lime, potash, and phosphoric acid. Of these the silica is found in greatest proportions in the stalk, and especially in that of wheat, rye, barley, oats, and corn, where its function is, apparently, to give the requisite stiffness to prevent the prostration of the plant by wind and rain.

Various attempts have been made to compound the ideal fertilizer—*i. e.*, one which shall contain all the elements derived by the plant from the soil, and in the proportions taken up by the particular crop which it is proposed to raise; and to this end various mixtures of lime, potash, phosphoric acid, &c., have been made and sold. In most instances, however, the silica has been either altogether ignored or added merely as an adulterant, in the form of sand, of which soils, unless very clayey, stand in no need.

In some instances silica has been added in the form of silicate of potash or soda, (water-glass,) but without any results which would indicate that its use in that form is advisable.

I have discovered that a fertilizer containing silica in the form of diatomaceous earth or tripoli answers every requisite. While this form of silica is, strictly speaking, just as insoluble in water as quartz rock for all purposes as a fertilizer, it is perfectly soluble. This tripoli is derived from the remains of diatoms or almost infinitesimally minute organisms of vegetable origin, which singly are invisible to the naked eye. Immense deposits of this tripoli are found in various parts of the United States, notably in Calvert county, Maryland, and in various localities in Virginia. These diatoms are so exceedingly minute as to be as readily taken up by the spongioles of plants as if they were actually in solution, and this fact has been incontestably demonstrated in many instances by a microscopic examination of the ashes of plants which have grown in soils fertilized by its application. Under the microscope the ash, especially of the stalk of grain, was seen to consist in great part of the delicate siliceous skeletons.

I grind, pulverize, or otherwise reduce to a powdered or granulated state this tripoli, and any of the well-known forms of phosphate of lime. These are intimately mixed, and in such relative proportions as are required by the condition of the soil, or by the particular crop which it is intended to sow.

It is obviously impossible to prescribe a proportion of ingredients which will be applicable to all crops; but all the information necessary may be obtained from any elementary work on agriculture where the analyses of the ash of the various crops are given. The tripoli and phosphate of lime should be mixed in the proportions of silica and phosphate of lime shown to be taken up by the particular crop which is to be raised, and added to the soil in the usual manner and in an amount governed by the natural condition of the soil.

The composition is readily passed through the ordinary drills, can be sold to the farmers at a very low price, and may be made the basis of great improvement in almost every soil.

The tripoli and phosphate of lime may be used together, as specified, with marked and continuously-increasing effect upon the soil, the grasses and grains being thereby made to grow with great luxuriance, while the effect of ammoniacal or stimulating manure will give a much increased product whenever the soil has been treated with my composition.

Having thus described my invention, what I claim as new, and desire to secure by Letters Patent, is—

1. A fertilizer containing tripoli or diatomaceous silica.

2. A fertilizer consisting of tripoli and phosphate of lime, both minutely subdivided and intimately mixed, as and for the purpose described.

GEORGE J. POPPLEIN.

Witnesses:
RICHD. D. WILLIAMS,
A. WAGNER.